(12) United States Patent
Corma Canós et al.

(10) Patent No.: US 7,344,697 B2
(45) Date of Patent: Mar. 18, 2008

(54) MICROPOROUS CRYSTALLINE ZEOLITE MATERIAL, ZEOLITE ITQ-28, PRODUCTION METHOD THEREOF AND USE OF SAME

(75) Inventors: Avelino Corma Canós, Valencia (ES); María José Sabater Picot, Valencia (ES); Susana Valencia Valencia, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 110 days.

(21) Appl. No.: 11/392,473

(22) Filed: Mar. 29, 2006

(65) Prior Publication Data

US 2006/0286029 A1    Dec. 21, 2006

Related U.S. Application Data

(63) Continuation of application No. PCT/ES2004/070074, filed on Sep. 24, 2004.

(30) Foreign Application Priority Data

Sep. 29, 2003    (ES)    ................ 200302334

(51) Int. Cl.
C01B 39/46    (2006.01)
C01B 39/48    (2006.01)

(52) U.S. Cl. ............... 423/718; 423/702; 423/706; 423/709; 502/71

(58) Field of Classification Search ......... 423/702, 423/706, 709, 718; 502/71
See application file for complete search history.

(56) References Cited

U.S. PATENT DOCUMENTS 4,544,538 A    10/1985 Zones
5,425,933 A    6/1995 Nakagawa (Continued)

FOREIGN PATENT DOCUMENTS

EP    0 337479    7/1992

(Continued)

Primary Examiner—David M Brunsman
(74) Attorney, Agent, or Firm—Klauber & Jackson L.L.C.

(57) ABSTRACT

The invention relates to a microporous crystalline zeolite material, zeolite ITQ-28, the production method thereof and the use of same. More specifically, the invention relates to a microporous crystalline zeolite material, ITQ-28, which, in the calcined state and in the absence of defects in the crystalline lattice thereof, manifested by the presence of silanols, is characterised by having empirical formula x $(M_{1/n}XO_2)$: y $YO_2$: $SiO_2$, wherein: M is selected from $H^+$, at least one inorganic cation with charge +n, preferably alkalines or alkaline earths, and a mixture of both; X is at least one chemical element in oxidation state +3, preferably Al, Ga, B, Fe, Cr or mixtures thereof; Y is at least a chemical element in oxidation state +4, which is different from Si, preferably Ge, Ti, Sn, V or mixtures of same; x has a value of between 0 and 0.2 inclusive; and y has a value of between 0 and 0.1 inclusive. The invention is further characterised in that the material as it is synthesised has an x-ray diffraction pattern with at least values of angle 2θ (degrees) and the relative intensities given in table 1. The invention also relates to the method of preparing said material and to the use thereof in the conversion of organic compounds.

21 Claims, 2 Drawing Sheets

U.S. PATENT DOCUMENTS 6,419,819 B1 * 7/2002 Dhingra et al. ............. 208/113
6,471,941 B1 * 10/2002 Boix et al. .................. 423/707
6,652,831 B1 * 11/2003 Villaescusa Alonso
 et al. .......................... 423/706
6,896,869 B2 * 5/2005 Corma Canos et al. ..... 423/718

FOREIGN PATENT DOCUMENTS

EP    1 148027    10/2001

* cited by examiner

MICROPOROUS CRYSTALLINE ZEOLITE MATERIAL, ZEOLITE ITQ-28, PRODUCTION METHOD THEREOF AND USE OF SAME

RELATED APPLICATIONS

The present application is a Continuation of co-pending PCT Application No. PCT/ES2004/070074, filed Sep. 24, 2004 which in turn, claims priority from Spanish Application Serial No. 200302334, filed on Sep. 29, 2003. Applicants claim the benefits of 35 U.S.C. §120 as to the PCT application and priority under 35 U.S.C. §119 as to said Spanish application, and the entire disclosures of both applications are incorporated herein by reference in their entireties.

FIELD OF THE INVENTION

The present invention is related to the technical field of microporous crystalline zeolite materials, useful as catalysts or as components of catalysts, for process that entail the transformation of organic compounds.

BACKGROUND OF THE INVENTION

Zeolites are microporous crystalline materials formed by a $TO_4$ tetrahedral network wherein all tetrahedrons share their vortexes creating a three-dimensional structure that contains molecule-sized channels and/or cavities. They have a variable composition and T generally represents atoms in a +3 o +4 formal oxidation state such as Si, Ge, Ti, Al, B, Ga, . . . When any of the T atoms is in an oxidation state lower than +4, the crystalline lattice that is formed displays negative charges that are compensated by the presence of organic or inorganic cations in the aforementioned channels or cavities present in the structure. Said channels and chambers may also house organic molecules and $H_2O$, and therefore, and in a general manner, the chemical composition of zeolites may be represented by the following empirical formula:

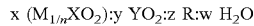

where M is one or several organic or inorganic cations with +n charge; X is one or several trivalent elements; Y is one or several tetravalent elements, usually Si; and R is one or several organic substances. Although by means of post-synthesis treatments the nature of M, X, Y and R and the values of x, y, z, and w can be changed, the chemical composition of a zeolite (as synthesized or after calcinations) has the characteristic range of each zeolite and of the method used to obtain it.

The crystalline structure of each zeolite has a species-specific system of channels and cavities. This channel and cavity system originates a characteristic pattern of x-ray diffraction that serves to differentiate them.

Many zeolites have been synthesized in the presence of an organic molecule that acts as a structure defining agent. These organic molecules that act as structure defining agents (SDAs) contain, generally, nitrogen and can originate stable organic cations in the reaction medium.

The mobilisation of the precursor species during zeolite synthesis can be done in the presence of hydroxyl groups and basic media, that can be introduced as a hydroxide of the SDA used, such as for example tetrapropyl ammonium hydroxide in the case of ZSM-5 zeolite. Also, the fluoride ions can act as mobilising agents during zeolite synthesis. Patent EP-A-337479, for instance, describes the use of HF in $H_2O$ at low pH as mobilising agent of silica in ZSM-5 zeolite synthesis.

DESCRIPTION OF THE INVENTION

The present invention refers to a new microporous crystalline zeolite material identified as "ITQ-28 zeolite", and to the preparation process thereof. This material, both in calcined and non-calcined synthesized form have an x-ray diffraction pattern different from that of other known zeolite materials, and therefore, it is characteristic and specific to this material.

The present invention refers, more particularly and firstly, to a microporous crystalline zeolite material that has, in its calcined form, and in the absence of any defects in the crystalline lattice manifested by the presence of silanols the following empirical formula:

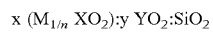

wherein:
M has been selected from $H^+$, at least one inorganic cation with +n charge, and a mixture of both,
X is at least one chemical element in +3 oxidation state,
Y is at least one chemical element in +4 oxidation state other than Si,
x takes a value between 0 and 0.2, both included,
y takes a value between 0 and 0.1, both included, and, since the material as synthesized has a pattern of x-ray diffraction with, at least, the 2θ (degree) angles values and related intensities (I/Io) shown in Table I, wherein $I_o$ is the intensity of the most intense peak—with an assigned value of 100—and wherein m, f and mf represent the values stated above.

TABLE I

| 2θ (degree) ± 0.5 | Intensity (I/I$_o$) |
|---|---|
| 9.57 | f |
| 14.73 | m |
| 19.79 | f |
| 20.40 | m |
| 21.17 | f |
| 21.40 | f |
| 21.93 | mf |
| 22.96 | mf |
| 23.25 | m |
| 24.58 | m |
| 26.79 | m | where m is a medium relative intensity between 20% and 40%,
f is a strong relative intensity between 40% and 60%, and
mf is a very strong relative intensity between 60% and 100%.

The microporous crystalline material according to the invention has, in calcined state, an x-ray diffraction pattern with at least the 2θ (degree) angles values and related intensities (I/I$_o$) shown in Table II below,

TABLE II

| 2θ (degree) ± 0.5 | Intensity (I/Io) |
|---|---|
| 9.61 | mf |
| 9.91 | f |

TABLE II-continued

| 2θ (degree) ± 0.5 | Intensity (I/Io) |
|---|---|
| 14.85 | m |
| 19.87 | d |
| 20.49 | d |
| 21.16 | d |
| 21.32 | d |
| 21.55 | d |
| 22.08 | m |
| 23.13 | f |
| 24.84 | d |
| 26.72 | m | wherein m, mf and f represent the values stated above and d is a weak relative intensity between 0 and 20%.

According to a preferred embodiment of the microporous crystalline zeolite material ITQ-28, X is Al, and "x" takes a value greater than 0 and less or equal to 0.2 to fulfil the relationship 0<x 0.2.

The X element is preferably selected among Al, Ga, B, Fe, Cr and mixtures of these elements.

The Y element is preferably selected among Ge, Ti, Sn, V and mixtures of these elements.

In the previous empirical formula "x" takes, preferably, a value lower than 0.1.

In the previous empirical formula "y" takes, preferably, a value lower than 0.05.

According to a specially preferred embodiment of the present invention the microporous crystalline zeolite material ITQ-28 has, in its calcined state and in the absence of any defects of the crystalline lattice as manifested by the presence of silanols, the following empirical formula:

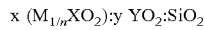

x $(M_{1/n}XO_2)$:y $YO_2$:$SiO_2$ wherein M, is selected from $H^+$, at least a +n charged inorganic cation, preferably selected among alkalines and alkali-earths, and a mixture of both,
    X is at least one chemical element in +3 oxidation state that has been selected from Al, Ga, B, Fe, Cr and mixtures of these elements,
    Y is at least one chemical element in +4 oxidation state different from Si and selected from Ge, Ti, Sn, V and mixtures of these elements,
    x takes a value between 0 and 0.1, both included,
    y takes a value between 0 and 0.05, both included, and the material, as synthesized, has an x-ray diffraction pattern that shows at least the values for the 2θ (degree) angle and the relative intensities mentioned above, and said material has, in its calcined state an x-ray diffraction pattern that shows at least the values for the 2θ (degree) angle and the relative intensities (I/Io) mentioned above.

The x-ray diffraction pattern of the ITQ-28 material as synthesized has been obtained by the powder method, using a fixed divergence slot and Cu Kα radiation.

It is possible, however, as a function of the synthesis method of ITQ-28 zeolite and as a function of the calcination or posterior treatments thereof, that there may be defects of the crystalline lattice as manifested by the presence of silanols groups (Si—OH). These defects have not been included in the previous empirical formula.

Table II shows the values of the 2θ (degree) angle and of the relative intensities (I/Io) for the most intense reflections obtained by the x-ray diffractogram from ITQ-28 zeolite powder once it has been calcinated to eliminate the organic compounds occluded inside it, and where d, m, f and mf have the values indicated above.

It must be taken into account that the diffraction data listed for this sample of ITQ-28 zeolite as single or unique lines may be formed by multiple overlaps or superposition of reflections that, under certain conditions, such as differences brought about crystallographic changes may appear as resolved or partially resolved lines. Generally, crystallographic changes may include small variations of the unit cell parameters and/or changes in the crystal symmetry, without this entailing a change of structure. Therefore, the peaks' position, width and intensities depend to a certain extent on the chemical composition of the material, as well as on the degree of hydration and the size of the crystal. Particularly, when the lattice is composed exclusively by silicon and aluminium oxides with a Si/Al ratio=19 and it has been synthesized in the presence of fluoride anions utilizing the quaternary ammonium cation 2,3-[bis(N-methyl-N-methylenpyrrolidinium)]-trans-5-norbornene as structure directing agent, the ITQ-28 zeolite as synthesized presents the x-ray diffraction pattern as the one shown in FIG. 1. This diagram is characterized by the values for the 2θ (degree) angle and relative intensities (I/Io) listed in Table II, where d, m, f and mf have the same values as those shown in Table II.

TABLE III

| 2θ (degree) ± 0.5 | Intensity (I/Io) |
|---|---|
| 7.53 | d |
| 7.96 | d |
| 8.34 | d |
| 8.75 | d |
| 9.75 | f |
| 9.86 | d |
| 14.58 | d |
| 14.73 | m |
| 15.30 | d |
| 16.10 | d |
| 17.35 | d |
| 17.53 | d |
| 17.95 | d |
| 19.24 | d |
| 19.79 | f |
| 20.40 | m |
| 21.17 | f |
| 21.40 | f |
| 21.93 | mf |
| 22.96 | mf |
| 23.25 | m |
| 23.67 | d |
| 23.99 | d |
| 24.58 | m |
| 24.90 | d |
| 25.29 | d |
| 25.79 | d |
| 26.49 | d |
| 26.79 | m |
| 28.06 | d |
| 29.10 | d |
| 29.41 | d |
| 29.85 | d |
| 30.64 | d |
| 31.04 | d |
| 31.67 | d |
| 31.90 | d |
| 32.12 | d |
| 35.13 | d |
| 35.46 | d |
| 35.73 | d |

FIG. 2 shows the pattern of x-ray diffraction of the previous ITQ-28 sample after having been calcinated at 580° to eliminate the organic compounds occluded inside the structure. This diffractogram is characterized by the values for the 2θ (degree) angle and the relative intensities (I/Io) shown in Table IV, where d, m, f and mf have the same values as those shown in Table III. The comparison between the x-ray diffractograms for as synthesized and calcinated ITQ-28 zeolite show the great thermal stability of this material.

TABLE IV

| 2θ (degree) ± 0.5 | Intensity (I/Io) |
|---|---|
| 7.61 | d |
| 7.97 | d |
| 8.41 | d |
| 8.84 | d |
| 9.61 | mf |
| 9.91 | f |
| 13.30 | d |
| 13.49 | d |
| 14.70 | d |
| 14.85 | m |
| 15.55 | d |
| 16.20 | d |
| 18.00 | d |
| 19.27 | d |
| 19.87 | d |
| 20.49 | d |
| 20.61 | d |
| 21.16 | d |
| 21.32 | d |
| 21.55 | d |
| 22.08 | m |
| 23.13 | f |
| 23.38 | d |
| 24.07 | d |
| 24.84 | d |
| 25.42 | d |
| 25.98 | d |
| 26.72 | m |
| 27.26 | d |
| 28.27 | d |
| 29.26 | d |
| 29.64 | d |
| 29.96 | d |
| 30.70 | d |
| 31.07 | d |
| 32.10 | d |
| 35.58 | d |

The microporous crystalline ITQ-28 material of the present invention may be in a form selected from an acid form, cation exchange form, and a mixture of both.

The present invention also refers to a process to synthesize the microporous crystalline ITQ-28 material characterized in that a reaction mixture comprising at least:
one or more sources of $SiO_2$,
one or more sources of organic R cation,
one or more sources of fluoride ions, and water, is heated at a temperature between 80 and 200° C. until crystallization is achieved, and also the reaction mixture has a composition, in terms of molar ratios between the following ranges:
$ROH/SiO_2$=0.01-1.0
$F/SiO_2$=0.1-3.0
$H_2O/SiO_2$=1-50

According to a particular embodiment of the process the reaction mixture also comprises:
a source of one or more trivalent elements X, and has a composition, in terms of molar ratios between the following ranges:
$ROH/SiO_2$=0.01-1.0
$X_2O_3/SiO_2$=0-0.1 excluding the value of 0
$F/SiO_2$=0.1-3.0, and
$H_2O/SiO_2$=1-50.

According to an additional particular embodiment of the process, the reaction mixture also comprises:
A source of one or more other tetravalent elements Y, different from Si, and has a composition, in terms of molar ratios between the following ranges:
$ROH/SiO_2$=0.01-1.0
$YO_2/SiO_2$=0-0.1 excluding the value of 0
$F/SiO_2$=0.1-3.0, and
$H_2O/SiO_2$=1-50

According to a further additional particular embodiment of the process, the reaction also comprises:
a source of one or more other tetravalent elements Y, different from Si,
a source of one or more trivalent elements X, and has a composition, in terms of molar ratios between the following ranges:
$ROH/SiO_2$=0.01-1.0
$X_2O_3/SiO_2$=0-0.1 excluding the value of 0
$YO_2/SiO_2$=0-0.1 excluding the value of 0
$F/SiO_2$=0.1-3.0, and
$H_2O/SiO_2$=1-50

According to a preferred particular embodiment of the process, the reaction mixture comprising:
a source of $SiO_2$,
a source of one or more tetravalent elements Y, and different from Si selected from Ge, Ti, V, Sn, and mixtures thereof,
a source of one or more trivalent elements X selected from Al, B, Ga, Fe, Cr and mixtures thereof,
a source of inorganic cations M of charge +n selected among alkaline metals, alkaline-earths and mixtures thereof,
one or more sources of the organic cation R, where R is 2,3-[bis(N-methyl-N-methylenpyrrolidinium)-trans-5-norbornene,
a source of fluoride ions, and,
water, is heated with or without stirring at a temperature between 80° and 200° C. until crystallization is achieved, and has a composition, in terms of molar ratios between the following ranges:
$ROH/SiO_2$=0.01-1.0
$M_{1/n}OH/SiO_2$=0-0.2
$X_2O_3/SiO_2$=0-0.5
$YO_2/SiO_2$=0-0.5
$F/SiO_2$=0.1-2.0, and
$H_2O/SiO_2$=1-20

The composition of the reaction mixture that results in the obtaining of the ITQ-28 material can be represented, in a general manner, by the following formula with the parameter values shown in terms of molar relationships:

$$r\ ROH:s\ M_{1/n}\ OH:t\ X_2O_3:u\ YO_2:v\ F:SiO_2:w\ H_2O$$

where M is one or more +n charged inorganic cations; preferably alkaline metals or alkaline-earths, X is one or more trivalent elements, preferably Al, B, Ga, Fe, Cr or a mixture thereof; Y is one or more tetravalent elements different from Si, preferably Ge, Ti, Sn, V, or a mixture of them; R is one or more organic cations, preferably 2,3-[bis (N-methyl-N-methylenpyrrolidinium)-trans-5-norbornene; F is one or more sources of fluoride ions, preferably HF, $NH_4F$, or a mixture of both, and the values r, s, t, u, v and w vary in the following ranges:
r=$ROH/SiO_2$=0.01-1.0, preferably 0.1-1.0
s=$M_{1/n}OH/SiO_2$=0-1.0, preferably 0-0.2
t=$X_2O_3/SiO_2$=0-0.1, preferably 0-0.5 u=YO$_2$/SiO$_2$=0-0.1, preferably 0-0.5
v=F/SiO$_2$=0.1-3.0, preferably 0.1-2.0
w=H$_2$O/SiO$_2$=1-50, preferably 1-20

The fluoride anion is used as mobilising agent for the precursor species. The preferred source for fluoride anions are HF, NH$_4$F or a mixture of both;

The thermal treatment of the mixture is done, preferably at a temperature range between 130 and 200° C.

The thermal treatment of the reaction mixture can be done statically or while stirring the mixture. Once the crystallization process is completed the solid product is separated by filtration or centrifugation and is then dried. The subsequent calcination is done at temperature above 350° C., preferably between 400° C. and 900° C., and produces the decomposition and expulsion of the organic rests occluded in the zeolite, clearing the zeolite channels.

The source of SiO$_2$ may be, for instance, tetraethylorthosilicate, colloidal silica, amorphous silica and a mixture of them;

Preferably, the organic cation R is the 2,3-[bis(N-methyl-N-methylenpyrrolidinium)-trans-5-norbornene.

The organic cation or cations as represented by R, are added to the reaction mixture preferably as a salt, such as a halide, or a hydroxide, and additionally, a source of alkaline ions, alkali-earth ions or a mixture of both (M) can be added as a hydroxide or a salt.

The components of the synthesis mixture can be obtained from different sources, and depending on them the times and conditions of crystallization can vary.

Preferably, the organic cation R is 2,3-[bis(N-methyl-N-methylenpyrrolidinium)-trans-5-norbornene, which is added, preferably in a form selected from dihydroxide and as a mix of a hydroxide and other salt, preferably a halide.

According to a particular embodiment of the process, inorganic oxides of the crystalline material can be added to the reaction mixture as promoters of crystallization in a quantity between 0.01 and 20% by weight in relation to the total inorganic oxides added.

Preferably, ITQ-28, the crystalline material object of the present invention is used as agent to promote crystallization and added to the reaction mixture in a quantity between 0.01 and 20% by weight in relation to the total amount of inorganic oxides, preferably between 0.05 and 10% by weight in relation to the total inorganic oxides added.

The organic cation 2,3-[bis(N-methyl-N-methylenpyrrolidinium)-trans-5-norbornene is synthesized according to the process represented in the following schema:

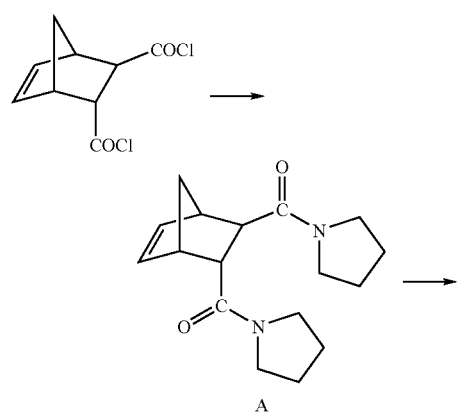

A

-continued

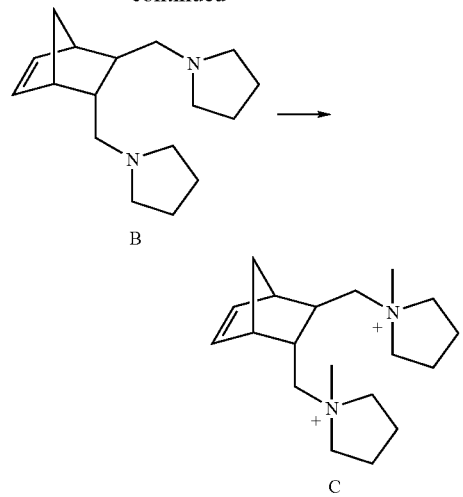

The process consists of obtaining the corresponding diamide (product A) from the 2,3-(dicarbonyl chloride)-trans-5-norbornene acid chloride and pyrrolidine. This diamide is later transformed into diamine (product B) and quaternized to form 2,3-[bis(N-methyl-N-methylenpyrrolidinium)]-trans-5-norbornene iodide (product C).

Also, the present invention refers to the use of an active form of ITQ-28 as catalyst in conversion processes of feeds formed by organic compounds.

The zeolite material ITQ-28 object of the present invention may be pelletized according to known techniques, and can be used as a component of catalytic cracking of hydrocarbon feedstock, hydrocarbon catalytic hydro-cracking, alkylation of aromatics with olefins and in sterification, acylation, reactions of aniline with formaldehyde in its acid form and/or cation exchanged with the appropriate cations.

Lastly, the present invention refers to an organic compound feed conversion characterized in that it comprises introducing an active form of ITQ-28 as catalyst in said feeding process for a period of time sufficient to attain the conversion of the organic compounds.

According to a particular embodiment of said method, it comprises introducing an active form of ITQ-28 as catalyst in a process with hydrocarbon feedstock and undergo a process selected between the catalytic cracking and the catalytic hydro-cracking of hydrocarbons.

According to a particular embodiment of said method, it comprises introducing an active form of ITQ-28 as catalyst, or as a component of catalysts, in a process with hydrocarbon feedstock and undergo a process selected among the alkylation of aromatics with olefins, sterification, acylation and, more specifically, in a reaction between aniline and formaldehyde.

According to said method, the ITQ-28 material can be in its acid form and/or in its cation exchanged form, exchanged with the appropriate cations.

EXAMPLES

Example 1

Figure 1:
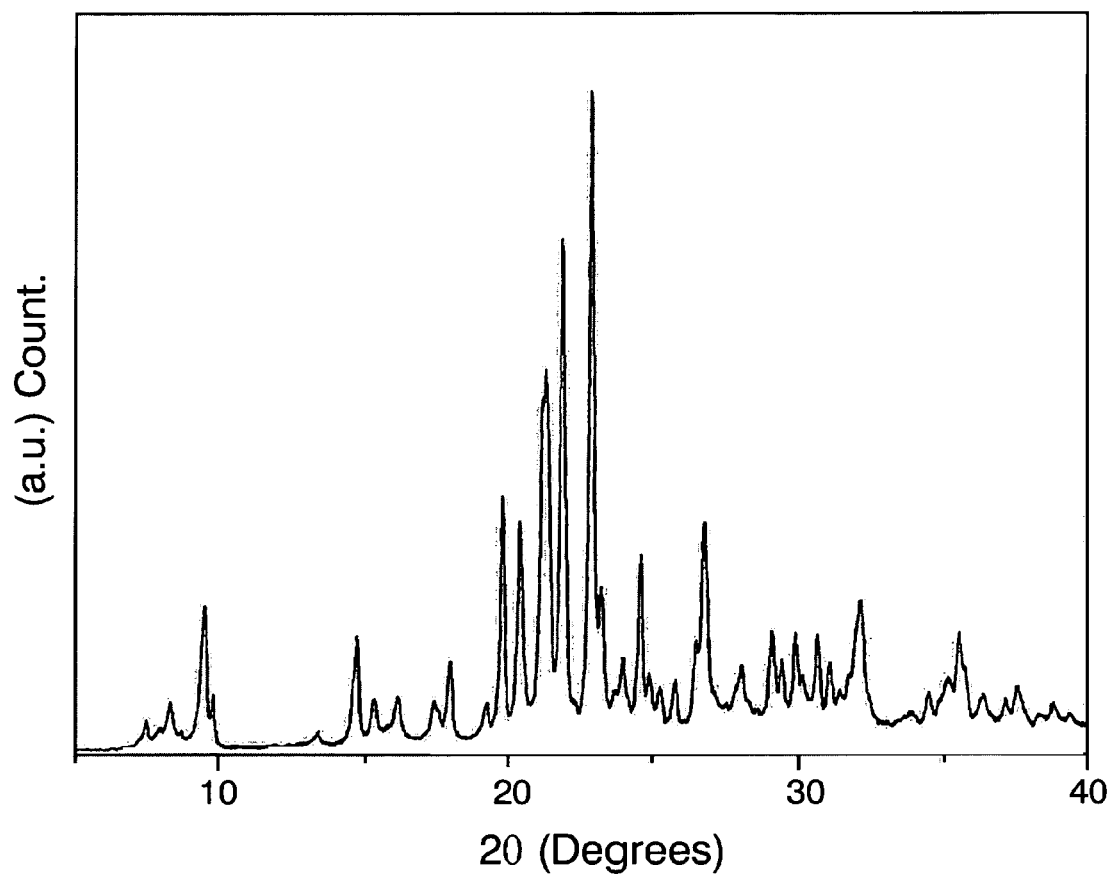
FIG. 1 represents the most characteristic peaks displayed in the x-ray diffraction pattern of the ITQ-28 material, as synthesized, obtained according to the process detailed in Example 3.

Preparation of the organic cation 2,3-[bis(N-methyl-N-methylenpyrrolidinium)-trans-5-norbornene.

First, 5 grams (22.82 mmol) of 2,3-(dicarbonyl chloride)-trans-5-norbornene are added to a round-bottom flask equipped with a reflux condenser and magnetic stirrer. The solution is cooled in an ice bath and 30 ml of a pyridine solution containing 17.04 g (240 mmol) of pyrrolidine is added drop by drop. Once the addition has been completed the solution is left stirring at 0° C. during 4 hours. The pyridine evaporates in a rotavapor and then 75 ml of 10% HCl are added, maintaining the stirring during 1 hour. The solution is extracted 3 times with dichloromethane. The organic extract is dried with $Na_2SO_4$ and it is then filtered and concentrated in the rotavapor to obtain product A (Yield:72%).

To obtain the product B, 25 ml of dry ether and 1.06 g (30.25 mmol) of $LiAlH_4$ are added to a round-bottom flask equipped with a reflux condenser and magnetic stirrer. Then, 4.36 g of diamide A dissolved in 50 ml of dried ether are added drop by drop. Once the addition has been completed the reaction mixture is heated at reflux during 2 hours. The reaction is cooled in an ice bath and then 1.5 ml of water are added followed by 1.5 ml of 15% NaOH. The resulting mixture is vigorously stirred during 0.5 h and then is filtered to eliminate the solids. The ether used during the organic phase is eliminated in the rotavapor and the residue left is treated with 25 ml of 10% HCl. Then, the mixture is taken to an alkaline pH and is again extracted with ether. The ether phase is dried with $Na_2SO_4$, filtered and concentrated in the rotavapor to obtain product B (Yield: 85%).

To obtain product C, 3.46 g (13.45 mmol) of diamine B dissolved in 30 ml of ethyl acetate are added to a round-bottom flask. Then, 15.27 g (107.57 mmol) of methyl iodide are added and the mixture is stirred at ambient temperature during 24 hours. After this time, compound C is formed as a solid that can be collected by filtration and it is thoroughly washed with ethyl acetate (Yield: 96%)

Example 2

Preparation of dihydroxide of 2,3-[bis(N-methyl-N-methylenpyrrolidinium)-trans-5-norbornene.

The 2,3-[bis(N-methyl-N-methylenpyrrolidinium)-trans-5-norbornene iodide obtained according to the procedure detailed in Example 1 is exchanged by hydroxide using an ion exchange resin proceeding as follows: 14 g (25.74 mmol) of the cation's iodide (product C) are dissolved in water. To the resulting solution 51.5 g of Dowex SBR resin are added and the mixture stirred continuously until the next day. Later, it is filtered, washed with distilled water thus obtaining a solution of dihydroxide of 2,3-[bis(N-methyl-N-methylenpyrrolidinium)]-trans-5-norbornene that is valued with HCl (aq.), using phenoftalein as indicator and obtaining an exchange efficiency greater than 90%. The final solution contains 0.21 equivalents of hydroxide per 1000 g of solution.

Example 3

Preparation of ITQ-28 Zeolite

First, 0.163 g of aluminium isopropoxide are added over 3.32 g of tetraethylorthosilicate (TEOS). Then, 39.8 g of a solution of dihydroxide of 2,3-[bis(N-methyl-N-methylenpyrrolidinium)-trans-5-norbornene $(R(OH)_2)$ containing 0.21 equivalents of hydroxide per 1000 g of solution are added. The mixture is left to evaporate while being stirred until the ethanol produced by the TEOS hydrolysis has been completely eliminated as well as the quantity of water necessary to reach the final composition as stated. Finally, 0.33 g of a hydrofluoric acid solution (50% of HF by weight) is added to the mixture. The composition of the resulting gel is as follows:

$SiO_2:0.025\ Al_2O_3:0.26\ R(OH)_2:0.52\ HF:7\ H_2O$

Figure 2:
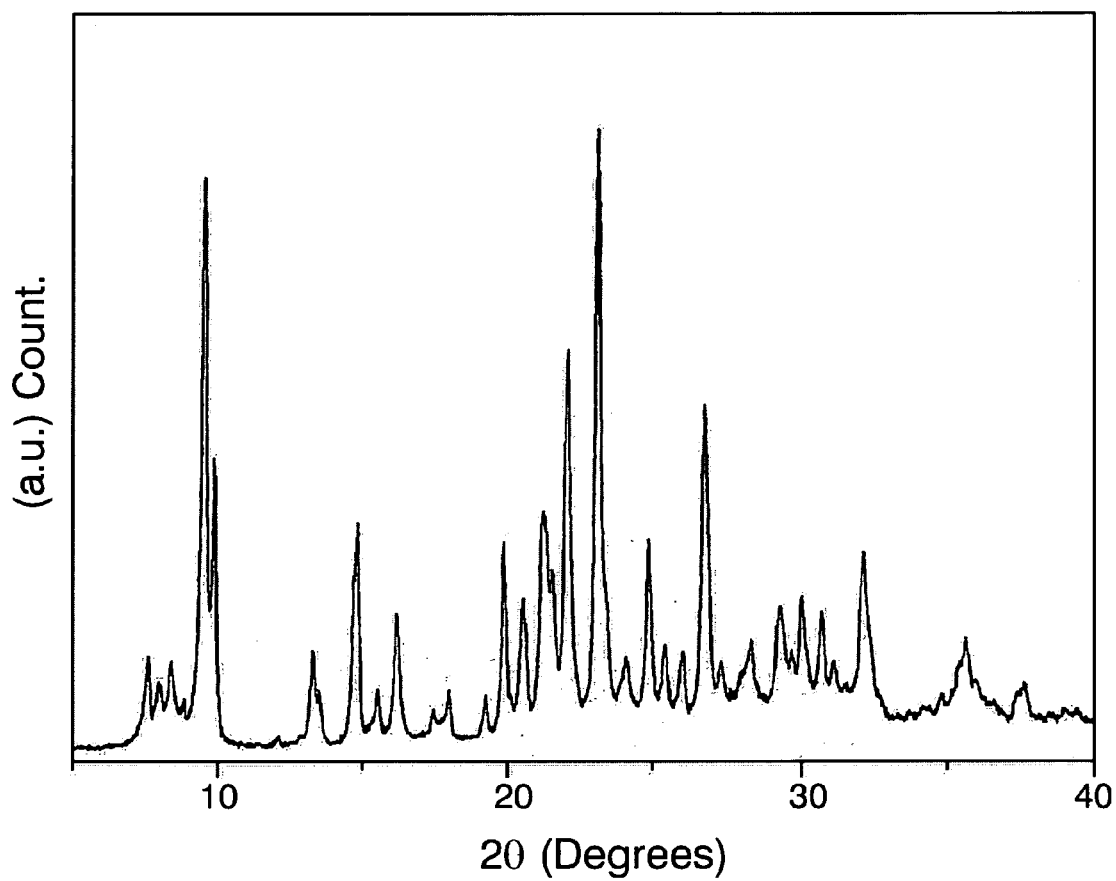

The mixture thus obtained is set in an autoclave coated with an internal layer of polytetrafluorethylene and heated at 175° during 30 days in a heater fitted with a rotation system. The x-ray diffractogram of the solid obtained after filtering and washing the mixture with distilled water and drying it at 100° C. is shown in FIG. 1, where the most characteristic peaks listed in Table III are shown. Calcination at 580° C. in air during 3 hours allows for the elimination of the occluded organic species. FIG. 2 shows the x-ray diffraction pattern of calcined ITQ-28 zeolite, displaying the most characteristic peaks listed in Table IV, indicating the material remains stable during this process.

Example 4

Preparation of ITQ-28 Zeolite

First, 0.245 g of aluminium isopropoxide are added over 5 g of tetraethylorthosilicate (TEOS). Then, 21 g of a solution of dihydroxide of 2,3-[bis(N-methyl-N-methylenpyrrolidinium)-trans-5-norbornene $(R(OH)_2)$ containing 0.6 equivalents of hydroxide per 1000 g of solution are added. The mixture is left to evaporate while being stirred until the ethanol produced by the TEOS hydrolysis has been completely eliminated as well as the quantity of water necessary to reach the final composition, as stated. Finally, 0.50 g of a hydrofluoric acid solution (50% of HF by weight) is added to the mixture. The composition of the resulting gel is as follows:

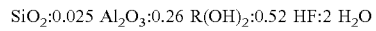

$SiO_2:0.025\ Al_2O_3:0.26\ R(OH)_2:0.52\ HF:2\ H_2O$

The mixture obtained is set in an autoclave coated with an internal layer of polytetrafluorethylene and heated at 175° during 20 days in a heater fitted with a rotation system. The solid obtained after filtering and washing the mixture with distilled water and drying it at 100° C. is ITQ-28 zeolite.

Example 5

Preparation of ITQ-28 Zeolite

First, 0.163 g of aluminium isopropoxide and 0.036 g of titanium tetroxide (IV) (TEOTi) are added over 3.3 g of tetraethylorthosilicate (TEOS). Then, 13.8 g of a solution of dihydroxide of 2,3-[bis(N-methyl-N-methylenpyrrolidinium)-trans-5-norbornene $(R(OH)_2)$ containing 0.61 equivalents of hydroxide per 1000 g of solution are added. The mixture is left to evaporate while being stirred until the ethanol produced by the TEOS and TEOTi hydrolysis has been completely eliminated as well as the quantity of water necessary to reach the final composition, as stated. Finally, 0.34 g of a hydrofluoric acid solution (50% of HF by weight) and 0.09 g of ITQ-28 zeolite suspended in water and prepared according to the procedure described in Example 3 are added to the mixture. The composition of the resulting gel is as follows:

$SiO_2:0.025\ Al_2O_3:0.01\ TiO_2:0.26\ R(OH)_2:0.52\ HF:7\ H_2O$

The mixture obtained is set in an autoclave coated with an internal layer of polytetrafluorethylene and heated at 175° during 30 days in a heater fitted with a rotation system. The solid obtained after filtering and washing the mixture with distilled water and drying it at 100° C. is ITQ-28 zeolite.

Example 6

Preparation of ITQ-28 Zeolite

First, 4 g of tetraethylorthosilicate (TEOS) are added over a 15.7 g. solution of dihydroxide of 2,3-[bis(N-methyl-N-methylenpyrrolidinium)-trans-5-norbornene $(R(OH)_2)$ containing 0.61 equivalents of hydroxide per 1000 g of solution. The mixture is left to evaporate while being stirred until the ethanol produced by the TEOS hydrolysis has been completely eliminated as well as the quantity of water necessary to reach the final composition as stated. Finally, 0.38 g of a hydrofluoric acid solution (50% of HF by weight) and 0.1 g of ITQ-28 zeolite suspended in water and prepared according to the procedure described in Example 3 are added to the mixture. The composition of the resulting gel is as follows:

$SiO_2:0.25\ R(OH)_2:0.5\ HF:7\ H_2O$

The mixture obtained is set in an autoclave coated with an internal layer of polytetrafluorethylene and heated at 175° during 14 days in a heater fitted with a rotation system. The x-ray diffractogram of the solid obtained after filtering and washing the mixture with distilled water and drying it at 100° C. show that the product thus formed is ITQ-28 zeolite.

Example 7

Preparation of ITQ-28 Zeolite

First, 4 g of tetraethylorthosilicate (TEOS) are added over a 16.5 g. solution of dihydroxide of 2,3-[bis(N-methyl-N-methylenpyrrolidinium)-trans-5-norbornene $(R(OH)_2)$ containing 0.61 equivalents of hydroxide per 1000 g of solution. Then a solution of 0.42 g of $Ga(NO_3)_3.10H_2O$ and 1 g of water are added. The mixture is left to evaporate while being stirred until the ethanol produced by the TEOS hydrolysis has been completely eliminated as well as the quantity of water necessary to reach the final composition as stated. Finally, 0.4 g of a hydrofluoric acid solution (50% of HF by weight) and 0.06 g of ITQ-28 zeolite suspended in water and prepared according to the procedure described in Example 3 are added to the mixture. The composition of the resulting gel is as follows:

$SiO_2:0.025\ Ga_2O_3:0.26\ R(OH)_2:0.52\ HF:7\ H_2O$

The mixture obtained is set in an autoclave coated with an internal layer of polytetrafluorethylene and heated at 175° during 40 days in a heater equipped with a rotation system. The x-ray diffractogram of the solid obtained after filtering and washing the mixture with distilled water and drying it at 100° C. show that the product thus formed is ITQ-28 zeolite.

While the invention has been described and illustrated herein by references to the specific embodiments, various specific material, procedures and examples, it is understood that the invention is not restricted to the particular materials, combinations of materials, and procedures selected for that purpose. Indeed, various modifications of the invention in addition to those described herein will become apparent to those skilled in the art from the foregoing description and the accompanying figures. Such modifications are intended to fall within the scope of the appended claims.

The invention claimed is:

1. A microporous crystalline zeolite material characterized in that it has, in the calcined state and in the absence of any defect in its crystalline lattice as manifested by the presence of silanols, the following empirical formula:

$x(M_{1/n}XO_2):yYO_2.SiO_2$ wherein:
  M is selected from $H^+$, at least one +n charged inorganic cation, and a mixture of both,
  X is, at least, one chemical element in +3 oxidation state,
  Y is, at least, one chemical element in +4 oxidation state and different from Si,
  x takes a value between 0 and 0.2, both included,
  y takes a value between 0 and 0.1, both included,
and in that the material having, as synthesized, an x-ray diffraction pattern with, at least, the following values for the 2θ (degree) angle and the relative intensities shown in the table below:

| 2θ (degree) ± 0.5 | Intensity (I/Io) |
|---|---|
| 9.57 | f |
| 14.73 | m |
| 19.79 | f |
| 20.40 | m |
| 21.17 | f |
| 21.40 | f |
| 21.93 | mf |
| 22.96 | mf |
| 23.25 | m |
| 24.58 | m |
| 26.79 | m | where
  m is a medium relative intensity between 20% and 40%,
  f is a strong relative intensity between 40% and 60%, and
  mf is a very strong relative intensity between 60% and 100%.

2. A microporous crystalline zeolite material according to claim 1, characterized in that in the calcined state it has an x-ray diffraction pattern with, at least, the following values for the 2θ (degree) angle and the relative intensities (I/Io) as shown in the table below:

| 2θ (degree) ± 0.5 | Intensity (I/Io) |
|---|---|
| 9.61 | mf |
| 9.91 | f |
| 14.85 | m |
| 19.87 | d |
| 20.49 | d |
| 21.16 | d |
| 21.32 | d |
| 21.55 | d |
| 22.08 | m |
| 23.13 | f |

| 2θ (degree) ± 0.5 | Intensity (I/Io) |
|---|---|
| 24.84 | d |
| 26.72 | m | where d is a weak relative intensity between 0 and 20%,
m is a medium relative intensity between 20 and 40%,
f is a strong relative intensity between 40 and 60%,
m is a very strong relative intensity between 60 and 100%.

3. A process for the conversion of a feed formed by organic compounds, comprising using a catalyst, the catalyst comprising the active form of the material described in claim 2.

4. A process according to claim 3, characterized in that said material is present as a component of the catalysts used in a process selected from catalytic cracking of hydrocarbons, catalytic hydro-cracking of hydrocarbons, alkylation of aromatic compounds with olefins, sterification, acylation and a reaction of aniline with formaldehyde.

5. A process according to claim 3, characterized in that said material is in a form selected among an acid form, a cation exchanged form and a mixture of both.

6. A microporous crystalline zeolite material according to claim 1, characterized in that X is Al, and "x" takes a value greater than 0 and lower than, or equal to 0.2 so that the relationship 0<x 0.2 is fulfilled.

7. A microporous crystalline zeolite material according to claim 1, characterized in that X is selected from Al, Ga, B, Fe, Cr and mixtures thereof.

8. A microporous crystalline zeolite material according to claim 1, characterized in that Y is selected from Ge, Ti, Sn, V and mixtures thereof.

9. A microporous crystalline zeolite material according to claim 1, characterized in that "x" takes a value lesser than 0.1.

10. A microporous crystalline zeolite material according to claim 1, characterized in that "y" takes a value lesser than 0.05.

11. A microporous crystalline zeolite material according to claim 1, characterized in that in calcined state and in the absence of defects in its crystalline lattice as manifested by the presence of silanols has the following empirical formula:

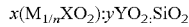

$x(M_{1/n}XO_2):yYO_2.SiO_2$ wherein,

M is selected from H$^+$, at least one +n charged inorganic cation selected from alkaline metals, alkali-earths, and a mixture of both, X is, at least, one chemical element in +3 oxidation state that has been selected from Al, Ga, B, Fe, Cr and mixtures of these elements, Y is, at least, one chemical element in +4 oxidation state different from Si, and selected from Ge, Ti, Sn, V and mixtures of these elements, x takes a value between 0 and 0.1, both included, y takes a value between 0 and 0.05, both included, and the material, as synthesized, has an x-ray diffraction pattern that has, at least, the following values for the 2θ (degree) angle and the relative intensities:

| 2θ (degree) ± 0.5 | Intensity (I/Io) |
|---|---|
| 9.57 | f |
| 14.73 | m |
| 19.79 | f |
| 20.40 | m |
| 21.17 | f |
| 21.40 | f |
| 21.93 | mf |
| 22.96 | mf |
| 23.25 | m |
| 24.58 | m |
| 26.79 | m | and said material has in calcined state an x-ray diffraction pattern with, at least, the following values for the 2θ (degrees) angle and the relative intensities (I/Io):

| 2θ (degree) ± 0.5 | Intensity (I/Io) |
|---|---|
| 9.61 | mf |
| 9.91 | f |
| 14.85 | m |
| 19.87 | d |
| 20.49 | d |
| 21.16 | d |
| 21.32 | d |
| 21.55 | d |
| 22.08 | m |
| 23.13 | f |
| 24.84 | d |
| 26.72 | m |

12. A microporous crystalline zeolite material according to claim 1, characterized in that said material is in a form selected from an acid form, a cation exchange form and a mixture of both.

13. A process to synthesize the microporous crystalline material according to claim 1, and characterized in that a reaction mixture comprising, at least, the following:
one or more sources of SiO$_2$,
one or several sources of the organic cation R,
one or more sources of fluoride ions, and
water, is heated at a temperature between 80 and 200° C. until crystallization is achieved, and the reaction mixture has a composition, in terms of molar ratios between the following ranges:
ROH/SiO$_2$=0.01-1.0,
F/SiO$_2$=0.1-3.0,
H$_2$O/SiO$_2$=1-50.

14. A process according to claim 13, characterized in that a reaction mixture comprises, in addition, the following:
a source of one or more trivalent elements X, and in that the reaction mixture has a composition, in terms of molar relationships, between the following ranges:
ROH/SiO$_2$=0.01-1.0,
X$_2$O$_3$/SiO$_2$=0-0.1 excluding the value of 0
F/SiO$_2$=0.1-3.0, and
H$_2$O/SiO$_2$=1-50.

15. A process according to claim 13, characterized in that a reaction mixture comprises, in addition, the following:
a source of one or more tetravalent elements Y, different from Si,
and the reaction mixture has a composition, in terms of molar relationships, between the following ranges:
ROH/SiO$_2$=0.01-1.0, $YO_2/SiO_2=0-0.1$ excluding the value of 0
$F/SiO_2=0.1-3.0$, and
$H_2O/SiO_2=1-50$.

16. A process according to claim 13 characterized in that a reaction mixture comprises, in addition, the following:
   a source of one or more tetravalent elements Y, different from Si, a source of one or more trivalent elements X, and it has a composition, in terms of molar relationships, between the following ranges:
   $ROH/SiO_2=0.01-1.0$,
   $X_2O_3/SiO_2=0-0.1$ excluding the value of 0
   $YO_2/SiO_2=0-0.1$ excluding the value of 0
   $F/SiO_2=0.1-3.0$, and
   $H_2O/SiO_2=1-50$.

17. A process according to claim 13, characterized in that a reaction mixture comprising:
   a source of $SiO_2$,
   a source of one or more tetravalent Y elements different from Si and selected from Ge, Ti, V, Sn and mixtures thereof,
   a source of one or more trivalent X elements selected from Al, B, Ga, Fe, Cr and mixtures thereof,
   a source of +n charged inorganic cations M,
   one or several sources of the organic cation R, where R is 2,3-[bis(N-methyl-N-methylenpyrrolidinium)-trans-5-norbornene,
   a source of fluoride ions, and
   water,
is heated with or without stirring at a temperature between 80 and 200° C. until crystallization is achieved, and the reaction mixture has a composition, in terms of molar relationships, between the following ranges:
   $ROH/SiO_2=0.01-1.0$,
   $M_{1/n}OH/SiO_2=0-1.0$
   $X_2O_3/SiO_2=0-0.1$
   $YO_2/SiO_2=0-0.1$
   $F/SiO_2=0.1-3.0$
   $H_2O/SiO_2=1-50$.

18. A process according to claim 13, characterized in that a reaction mixture comprising the following:
   a source of $SiO_2$,
   a source of one or more tetravalent Y elements different from Si and selected from Ge, Ti, V, Sn and mixtures thereof,
   a source of one or more trivalent X elements selected from Al, B, Ga, Fe, Cr and mixtures thereof,
   a source of +n charged inorganic cations M,
   one or several sources of the organic cation R, where R is 2,3-[bis(N-methyl-N-methylenpyrrolidinium)-trans-5-norbornene,
   a source of fluoride ions, and
   water,
is heated with or without stirring at a temperature between 80 and 200° C. until crystallization is achieved, and the reaction mixture has a composition, in terms of molar relationships, between the following ranges:
   $ROH/SiO_2=0.01-1.0$,
   $M_{1/n}OH/SiO_2=0-0.2$
   $X_2O_3/SiO_2=0-0.05$
   $YO_2/SiO_2=0-0.05$
   $F/SiO_2=0.1-2.0$,
   $H_2O/SiO_2=1-20$.

19. A process according to claim 13, characterized in that the organic cation R is 2,3-[bis(N-methyl-N-methylenpyrrolidinium)-trans-5-norbornene, and that in this cation is added in a form selected between dihydroxide and a mixture of hydroxide and another salt.

20. A process according to claim 13, characterized in that to the reaction mixture is added a quantity of crystalline material to serve as a promoter of crystallization in an amount between 0.01 and 20% by weight in relation to the total inorganic oxides added.

21. A process according to claim 20, characterized in that to the reaction mixture a quantity of crystalline material is added, to serve as a promoter of crystallization in an amount between 0.05 and 10% by weight in relation to the total inorganic oxides added, wherein the crystalline material comprises:
   a microporous crystalline zeolite material characterized in that it has, in the calcined state and in the absence of any defect in its crystalline lattice as manifested by the presence of silanols, the following empirical formula:

$$x(M_{1/n}XO_2):yYO_2.SiO_2$$

wherein:
   M is selected from $H^+$, at least one +n charged inorganic cation, and a mixture of both,
   X is, at least, one chemical element in +3 oxidation state,
   Y is, at least, one chemical element in +4 oxidation state and different from Si,
   x takes a value between 0 and 0.2, both included,
   y takes a value between 0 and 0.1, both included,
and in that the material having, as synthesized, an x-ray diffraction pattern with, at least, the following values for the 2θ (degree) angle and the relative intensities shown in the table below:

| 2θ (degree) ± 0.5 | Intensity (I/Io) |
|---|---|
| 9.57 | f |
| 14.73 | m |
| 19.79 | f |
| 20.40 | m |
| 21.17 | f |
| 21.40 | f |
| 21.93 | mf |
| 22.96 | mf |
| 23.25 | m |
| 24.58 | m |
| 26.79 | m | where
   m is a medium relative intensity between 20% and 40%,
   f is a strong relative intensity between 40% and 60, and
   mf is a very strong relative intensity between 60% and 100%.

* * * * *